United States Patent
Hussain et al.

(10) Patent No.: US 9,378,033 B2
(45) Date of Patent: Jun. 28, 2016

(54) METHOD AND APPARATUS FOR A VIRTUAL SYSTEM ON CHIP

(71) Applicant: Cavium, Inc., San Jose, CA (US)

(72) Inventors: Muhammad Raghib Hussain, Saratoga, CA (US); Rajan Goyal, Saratoga, CA (US); Richard Kessler, Northborough, MA (US)

(73) Assignee: Cavium, Inc., San Jose, CA (US)

( * ) Notice: Subject to any disclaimer, the term of this patent is extended or adjusted under 35 U.S.C. 154(b) by 149 days.

(21) Appl. No.: 14/452,873

(22) Filed: Aug. 6, 2014

(65) Prior Publication Data

US 2014/0359621 A1 Dec. 4, 2014

Related U.S. Application Data

(63) Continuation of application No. 12/769,463, filed on Apr. 28, 2010, now Pat. No. 8,826,271.

(51) Int. Cl.
*G06F 9/455* (2006.01)
*G06F 9/50* (2006.01)
*G06F 12/06* (2006.01)
*G06F 12/14* (2006.01)

(52) U.S. Cl.
CPC ............ *G06F 9/455* (2013.01); *G06F 9/45558* (2013.01); *G06F 9/5077* (2013.01); *G06F 12/0653* (2013.01); *G06F 12/14* (2013.01); *G06F 2009/45583* (2013.01); *G06F 2212/1008* (2013.01)

(58) Field of Classification Search
None
See application file for complete search history.

(56) References Cited

U.S. PATENT DOCUMENTS

| | | | |
|---|---|---|---|
| 6,587,938 B1 * | 7/2003 | Eilert | G06F 9/5061 712/13 |
| 8,826,271 B2 | 9/2014 | Hussain et al. | |
| 2002/0010844 A1 * | 1/2002 | Noel | G06F 9/5077 711/153 |
| 2002/0087611 A1 * | 7/2002 | Tanaka | G06F 9/5077 718/1 |
| 2002/0099901 A1 * | 7/2002 | Tanaka | G06F 3/0622 711/6 |
| 2006/0070065 A1 * | 3/2006 | Zimmer | G06F 9/5016 718/1 |
| 2007/0028244 A1 * | 2/2007 | Landis | G06F 9/5016 718/108 |
| 2007/0214456 A1 * | 9/2007 | Casey | G06F 9/50 718/100 |
| 2008/0086729 A1 * | 4/2008 | Kondoh | G06F 9/5077 718/1 |
| 2008/0133842 A1 * | 6/2008 | Raikin | G06F 12/0802 711/145 |
| 2008/0163203 A1 * | 7/2008 | Anand | G06F 9/45533 718/1 |
| 2009/0083263 A1 * | 3/2009 | Felch | G06F 9/3851 |
| 2010/0268523 A1 * | 10/2010 | Dhanwada | G06F 11/3013 703/21 |
| 2012/0054848 A1 * | 3/2012 | Salowey | H04W 12/06 726/10 |
| 2014/0359622 A1 | 12/2014 | Hussain et al. | |

* cited by examiner

*Primary Examiner* — Dong Kim
(74) *Attorney, Agent, or Firm* — Hamilton, Brook, Smith & Reynolds, P.C.

(57) ABSTRACT

A virtual system on chip (VSoC) is an implementation of a machine that allows for sharing of underlying physical machine resources between different virtual systems. A method or corresponding apparatus of the present invention relates to a device that includes a plurality of virtual systems on chip and a configuring unit. The configuring unit is arranged to configure resources on the device for the plurality of virtual systems on chip as a function of an identification tag assigned to each virtual system on chip.

18 Claims, 6 Drawing Sheets

METHOD AND APPARATUS FOR A VIRTUAL SYSTEM ON CHIP

RELATED APPLICATION

This application is a continuation of U.S. application Ser. No. 12/769,463, filed Apr. 28, 2010. The entire teachings of the above application are incorporated herein by reference.

BACKGROUND

A virtual machine is a software implementation of a physical machine that operates similar to a physical machine. Multiple virtual machines may be implemented on a physical machine to allow for sharing of the underlying physical machine resources.

SUMMARY

An example embodiment of the present invention relates to a device that includes a plurality of virtual systems on chip and a configuring unit. The configuring unit is arranged to configure resources on the device for the plurality of virtual systems on chip as a function of an identification tag assigned to each virtual system on chip.

Another embodiment of the present invention relates to a processor device that includes a plurality of virtual systems on chip, a plurality of operating system applications, and a configuring unit. The configuring unit is arranged to exclusively assign the plurality of virtual systems on chip to each operating system application as a function of an identification tag assigned to each virtual system on chip.

In the view of the foregoing, the following description illustrates example embodiments and features that may be incorporated into a system for configuring resources on a processor device, where the term "system" may be interpreted as a system, a subsystem, apparatus, method or any combination thereof, with regard to embodiments of the present invention.

The configuring unit may assign the identification tag to each virtual system on chip.

The system may include a plurality of processing cores and each virtual system on chip may relate to a subset of the plurality of processing cores. The configuring unit may partition the plurality of processing cores into subsets of the plurality of the processing cores that relate to corresponding virtual systems on chip. The configuring unit may assign an identification tag corresponding to the identification tag of a virtual system on chip to the subset of the one or more processing cores that relate to the virtual system on chip. The configuring unit may partition work requests for the one or more processing cores into subsets having identification tags associated with the plurality of virtual systems on chip, and the plurality of virtual systems on chip may process the work requests as a function of the identification tags.

The configuring unit may assign subsets of dynamic random access memory to each of the plurality of virtual systems on chip, and each assigned subset of the dynamic random access memory may be further assigned the identification tag associated with its corresponding virtual system on chip. The processor may assign the identification tags to each subset of the dynamic random access memory. The configuring unit may configure access to dynamic random access memory resources as a function of the identification tag. The configuring unit may prevent access to a partition of the dynamic random access memory having an assigned identification tag by a virtual system on chip having a different identification tag. The configuring unit may issue a violation signal in an event an attempt to access the partition of the dynamic random access memory having the assigned identification tag by the virtual system on chip having the different identification tag is made. The configuring unit may assign a shared portion of the dynamic random access memory resources to all virtual systems on chip independent of their identification tags. The configuring unit may assign a priority for accessing the dynamic random access memory resources to each of the plurality of virtual systems on chip as a function of the identification tag.

The system may include a level two cache. The level two cache may provide access to dynamic random access memory resources as a function of the identification tag.

The system may include a free pool unit. The free pool unit may allocate processing memory to work requests as a function of the identification tags.

The configuring unit may configure input and output resources for the plurality of virtual systems on chip. The system may include an inbound interconnect unit. The inbound interconnect unit may assign work requests to corresponding virtual systems on chip as a function of the identification tag. The inbound interconnect unit may assign the work requests as a function of a preconfigured database relating the identification tag to a corresponding virtual system on chip.

The system may include a packet input processing unit. The packet input processing unit may allocate one or more buffers from address space of a virtual system on chip to work requests assigned to the virtual system on chip as a function of the identification tag.

The system may include a packet order and work unit. The packet order and work unit may schedule work requests as a function of the identification tags. The packet order and work unit may generate an input queue entry for the work requests assigned to the virtual system on chip as a function of the identification tag. The packet order and work unit may schedule work requests within each of the plurality of virtual systems on chip. The packet order and work unit may schedule work requests among the plurality of virtual systems on chip as a function of the identification tag.

The plurality of virtual systems on chip may be coupled with a packet output processing unit having an output entry queue. Each virtual system on chip may be coupled with a corresponding packet output processing unit that includes one or more output entry queues exclusively assigned to the virtual system on chip. Each output entry queue may be assigned to the virtual system on chip as a function of the identification tag. The system may include a security unit in a level two cache that prevents a virtual system on chip from access to output entry queues of other virtual systems on chip. At least one output entry queue may have a higher priority than other output entry queues.

The one or more virtual systems on chip may be coupled with an output entry queue. The output entry queue may receive output entries having the identification tag corresponding to originating virtual system on chip.

The one or more virtual systems on chip may be coupled with a packet output processing unit. The packet output processing unit may process each output entry as a function of the identification tag.

The system may include an output processing unit. The output processing unit may release processing memory being used by a work request from address space of a virtual system on chip upon completion of the work request as a function of the identification tag. Each of the one or more virtual systems on chip may include an associated priority. The packet output processing unit may process each output entry as a function of the associated priority.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A virtual system on chip (VSoC) is an implementation of a machine that allows for sharing of underlying physical machine resources between different virtual systems. Under a VSoC implementation, multiple operating system applications can co-exist on the same physical machine with complete isolation from one another and protection.

Certain example embodiments of the present invention relate to providing hardware support for isolation, protection, priority configuration, and resource allocation of memory and I/O accesses from multiple operating systems running on different cores in a multi-core processing system. The example embodiments also support sharing of input and output resources among multiple virtual systems on chip (VSoC) running on multiple groups of cores with no software overhead.

Figure 1A:
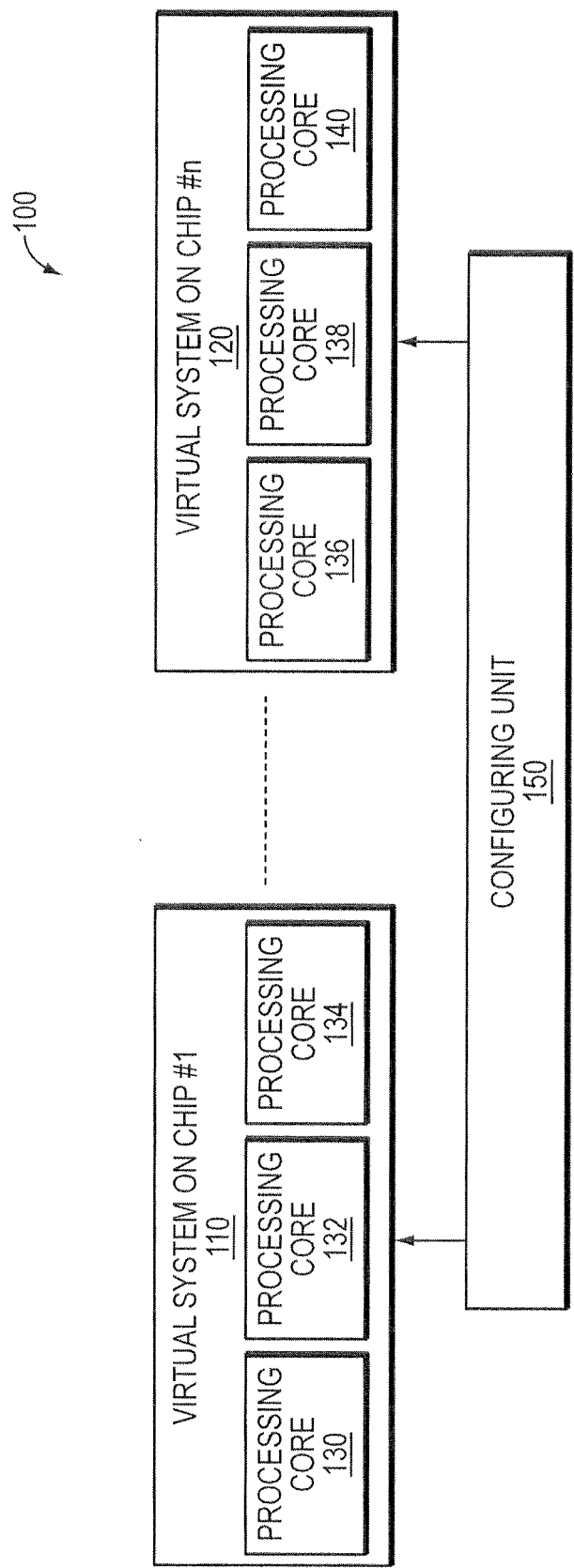
FIG. 1A is a high-level block diagram of an example embodiment of the present invention.

FIG. 1A is a high-level block diagram of an example embodiment 100 of the present invention. The example embodiment 100 includes a plurality of virtual systems on chip 110, 120 and a virtual system on chip configuring unit 150. The virtual system configuring unit 150 configures resources on the device for the virtual systems on chip 110, 120 using an identification tag assigned to each virtual system on chip 110,120. The identification tag may be assigned by the configuring unit 150 to each virtual system on chip. The configuring unit 150 may partition a plurality of processing cores 130-140 into subsets and assign the subsets using the identification tags to corresponding virtual systems on chip 110, 120. The configuring unit may further partition work requests for the processing cores 130-140 into subsets having identification tags corresponding to the virtual systems on chip 110, 120. Each virtual system on chip 110, 120 processes work requests having an identification tag corresponding to that virtual system.

The configuring unit 150 may further configure input and output resources for the plurality of virtual systems on chip 110, 120. For example in the ingress direction, the configuration unit 150 may assign work requests to corresponding virtual systems on chip 110, 120 as a function of the identification tag. In some embodiments, an incoming work request may be processed to extract directly or indirectly (using information from packet header or payload) its corresponding identification tag. Specifically, a preconfigured database relating the identification tag to a corresponding virtual system on chip may be employed.

Figure 1B:
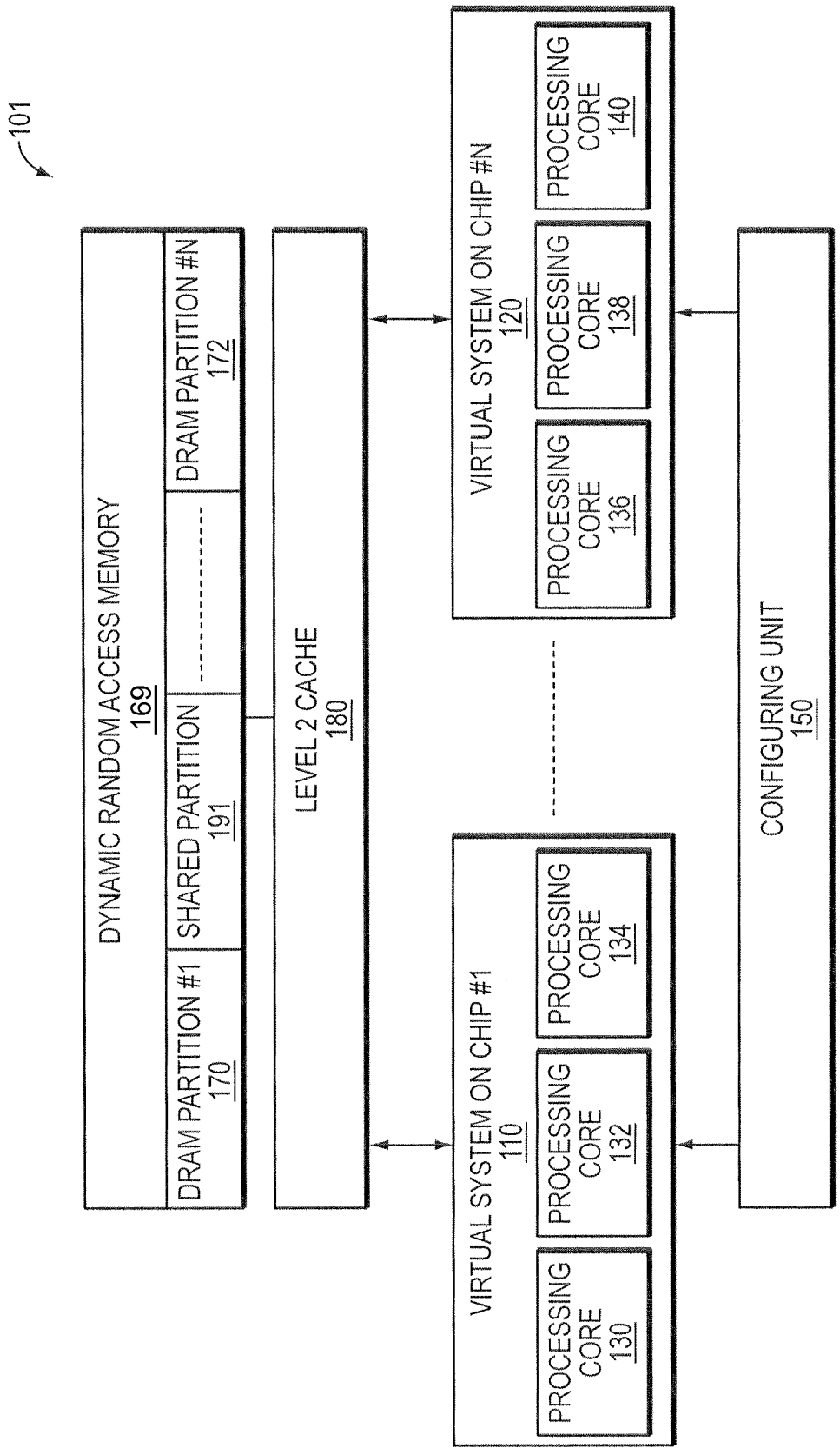
FIG. 1B is a high-level block diagram of an example embodiment of the present invention.

FIG. 1B is a high-level block diagram of an example embodiment 101 of the present invention. As described in relation to FIG. 1A, the example embodiment 101 includes a plurality of virtual systems on chip 110, 120 and a virtual system on chip configuring unit 150. The virtual system configuring unit 150 configures resources on the device for the virtual systems on chip 110, 120 using an identification tag assigned to each virtual system on chip 110,120. The identification tag may be assigned by the configuring unit 150 to each virtual system on chip. The configuring unit 150 may partition a plurality of processing cores 130-140 into subsets and assign the subsets using the identification tags to corresponding virtual systems on chip 110, 120.

The configuring unit 150 may partition the dynamic random access memory 169 into subsets 170, 172 assigned to each virtual system on chip 110, 120. Each assigned dynamic random memory partition 170, 172 is further assigned an identification tag associated with its corresponding virtual system on chip. The identification tag may be assigned to the partitions 170, 172 by the configuring unit 150.

The configuring unit 150 may provide access to dynamic random access memory partitions 170, 172 as a function of the identification tag. In some embodiments, the configuring unit 150 prevents access to a partition of the dynamic random access memory having an assigned identification tag by a virtual system on chip having a different identification tag. In an event an attempt to access the partition of the dynamic random access memory having an assigned identification tag by a virtual system on chip with a different identification tag is made, the configuring unit 150 may issue a warning sign. The dynamic random access memory may include a shared partition 191 that can be accessed by all virtual systems regardless of their identification tag.

A level-two cache 180, or any other central module that encounters memory accesses from units such as cores, hardware assist engines, input/output block, etc., may further be configured based on the identification tag. In some embodiments the level-two cache 180 provides access to dynamic random access memory resources 169 based on the identification tag. The level two cache 180 may include a security unit that prevents a virtual system on chip from access to other virtual systems on chip.

In certain embodiments level two cache 180 may include a security unit that restricts memory accesses to different virtual systems on chip with low level granularity.

In certain embodiments the virtual systems on chip 110, 120 may be configured to have priority in terms of input and output entry processing and accessing the dynamic access memory such that one virtual system on chip 110 may have strict or weighted priority over other virtual systems on chip.

In certain embodiment level two cache 180 may include a priority unit that allows priority based memory access by different virtual systems on chip. The priority may be strict, weighted round robin or a mix of them.

Figure 1C:
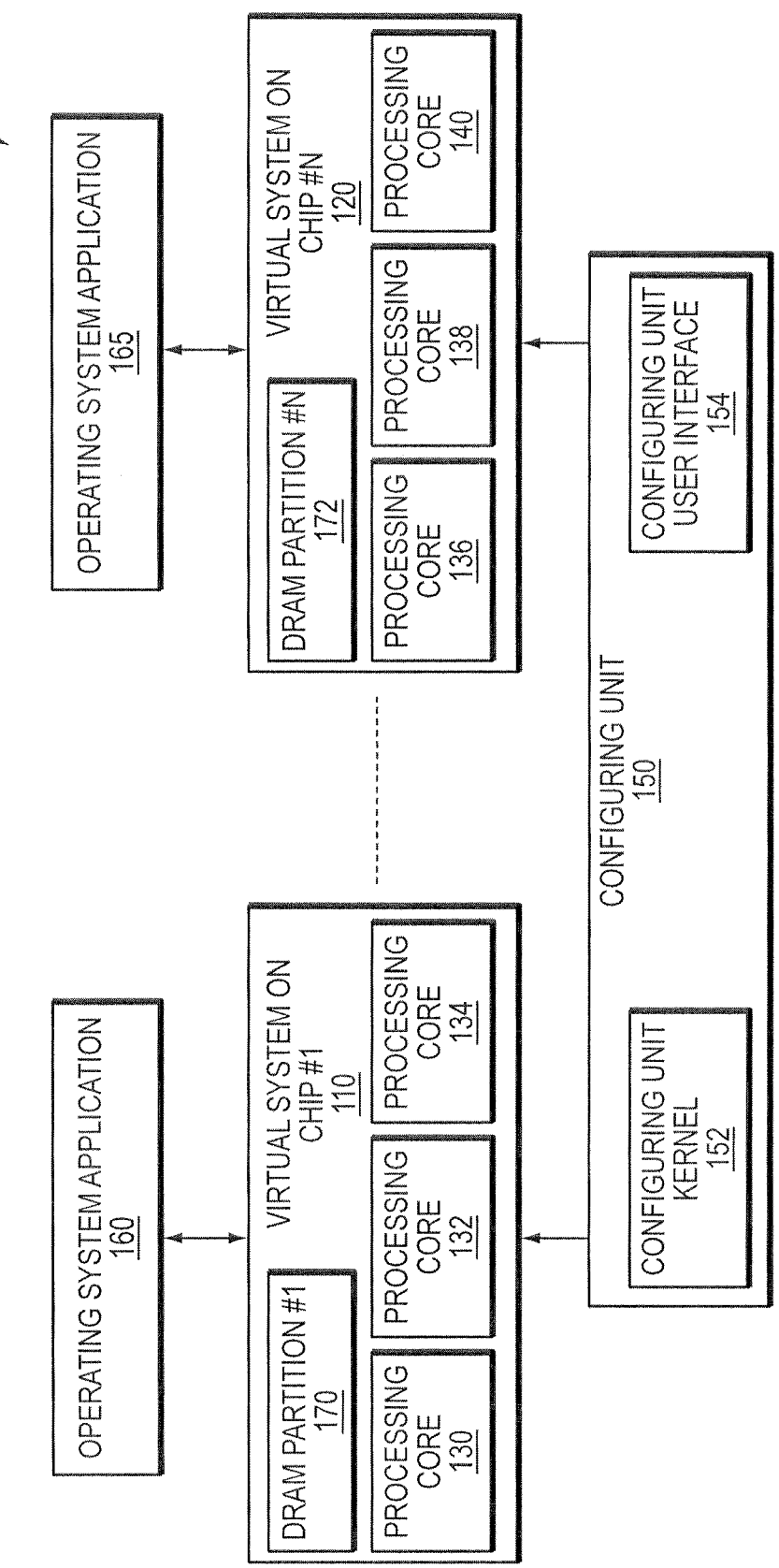
FIG. 1C is an illustration of an example embodiment of the present invention.

FIG. 1C is an illustration of an example embodiment 102 of the present invention. The example embodiment 102 allows for embedded multi-core virtualization (EMV), which is a low overhead virtualization technology that is targeted towards embedded high throughput applications on multi-core chips. Embedded multi-core virtualization is a virtualization of software on chip as opposed to the traditional central processing unit (CPU) core virtualization commonly employed in the art.

The example embodiment 102 divides a single physical system on chip into multiple virtual systems on chip 110, 120 using a combination of hardware and software features (not shown). By doing so, the example embodiment 102 provides for low overhead sharing of resource on chip while providing isolation and protection between the multiple virtual systems on chip 110, 120. The example embodiment 102 also provides hardware support to eliminate performance overheads. Specifically, the example embodiment 102 provides the ability to group the processing cores into corresponding subsets included in each virtual system on chip. The example embodiment 102 further provides for partitioning of dynamic random access memory (DRAM) into subsets assigned to each virtual system on chip. Input/output blocks and co-processor (not shown) may be portioned between the multiple virtual systems on chip 110, 120 as well.

By partitioning the system resources into multiple virtual systems on chip 110, 120, the example embodiment 102 provides for executing multiple embedded applications and operating systems on the same chip while enabling sharing of the chip resources and protection between among the multiple virtual systems on chip 110, 120.

The example embodiment 102 may include a configuring unit 150 which provides support for partitioning the resources of the chip (e.g., processing cores 130-140, DRAM, input/output blocks, coprocessors, etc.) into the multiple virtual systems on chip 110, 120. The configuring unit 150 may include two components, namely a configuring unit kernel 152 and configuring unit user interface 154.

The virtual systems 110, 120 serve as virtualized execution environments for executing operating systems and embedded applications. The configuring unit user interface 154 configures the virtual systems on chip to ensure that each virtual system on chip maintains complete ownership of its CPU cores. Each virtual system on chip includes the input/output blocks defined by a specific device tree configured by the configuring unit Kernel 152. Further, each device in the device tree of the virtual system on chip may be directly mapped to a physical device or shared with other virtual systems on chip.

Applications and operating systems (i.e., software) 160, 165 running inside a virtual system on chip employ virtualized device drives as configured by the configuring unit Kernel 152. Given the protection provided by the multiple virtual systems on chip, applications and operating systems running on a virtual system on chip may not be aware of other applications and operating systems running inside other virtual systems on chip.

The configuring unit 150 initializes and controls all platform hardware (e.g., CPU cores 130-140, devices, interrupt controllers (not shown), etc.). The configuring unit 150 further supports creation and management of multiple virtual systems on chip 110, 120. In doing so, the configuring unit 150 exports a partition specific device tree of virtual systems to each partition and exports a user interface for partitions to program virtual systems. The configuring unit 150 further multiplexes the virtual systems on physical devices.

The configuring unit 150 provides hardware support for partitioning of DRAM by using unique identification tags (VMID) assigned to each virtual system on chip. All cores belonging to the virtual system on chip are also assigned the same VMID. A level two cache provides access control to DRAM segments based on the VMID assigned to each virtual system on chip. Specifically, the configuring unit Kernel programs the level two cache to protect DRAM segments 170, 172 belonging to a virtual system on chip from being accessed by other virtual systems on chip. Each memory request from a core is also associated with a VMID. Therefore, any memory access (e.g., work request) to a memory segment not permitted by a VMID assigned to a core causes an access violation.

The configuration unit Kernel also programs the level two cache controller to provide DRAM access priority for various virtual system on chip. Access to DRAM from a virtual system on chip may be prioritized based on the VMID of the request.

Figure 2:
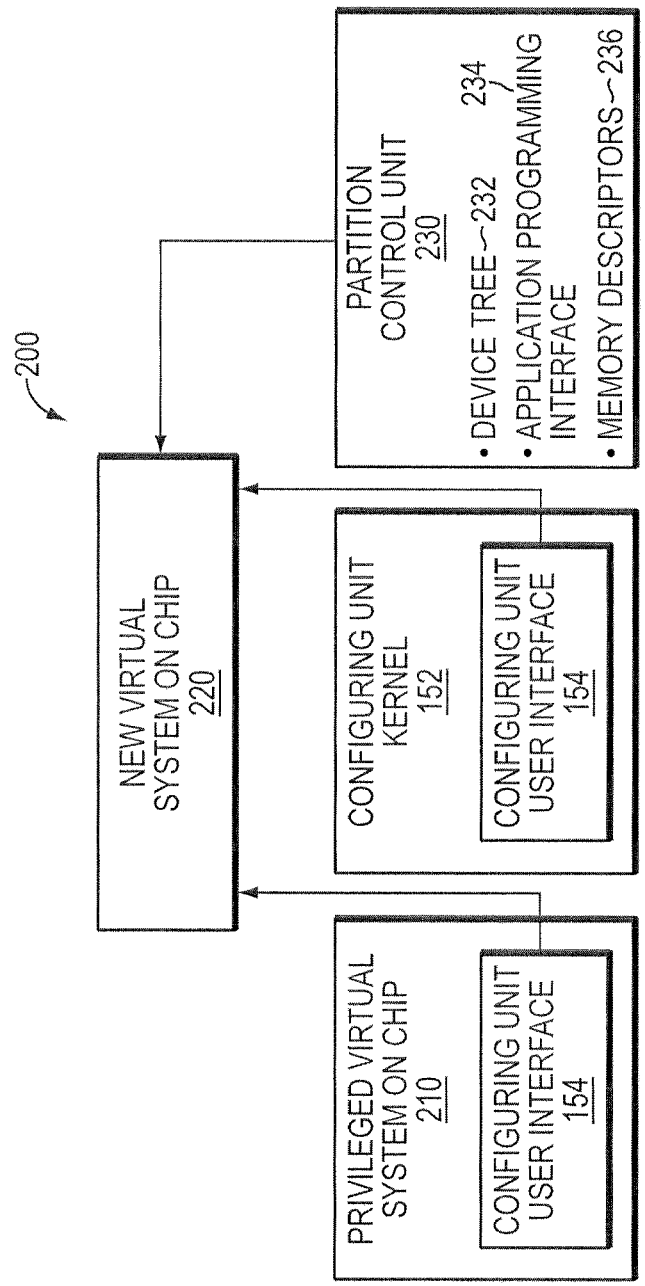
FIG. 2 is an example embodiment of a Virtual System on Chip (VSoC) management functions offered by certain embodiments of the present invention.

FIG. 2 is an example embodiment 200 of virtual system on chip management functions offered by certain embodiments of the present invention.

The configuring unit user interface 154 provides the interface for virtual system on chip management. The configuring unit user interface 154 may run as a part of the configuring unit kernel 152 or be hosted on a privileged virtual system on chip 210. The configuring unit user interface 154 assigns resources (e.g., DRAM and input/output devices) to individual virtual systems on chip. Each newly launched virtual system on chip 220 includes a partition control unit 230. The partition control unit 230 includes elements such as a virtual system on chip specific device tree 232, memory descriptors for memory belonging to the virtual system on chip 236, and one or more application programming interfaces for input/output (i.e., virtualized device drivers), messaging, and shared memory 234.

Figure 3:
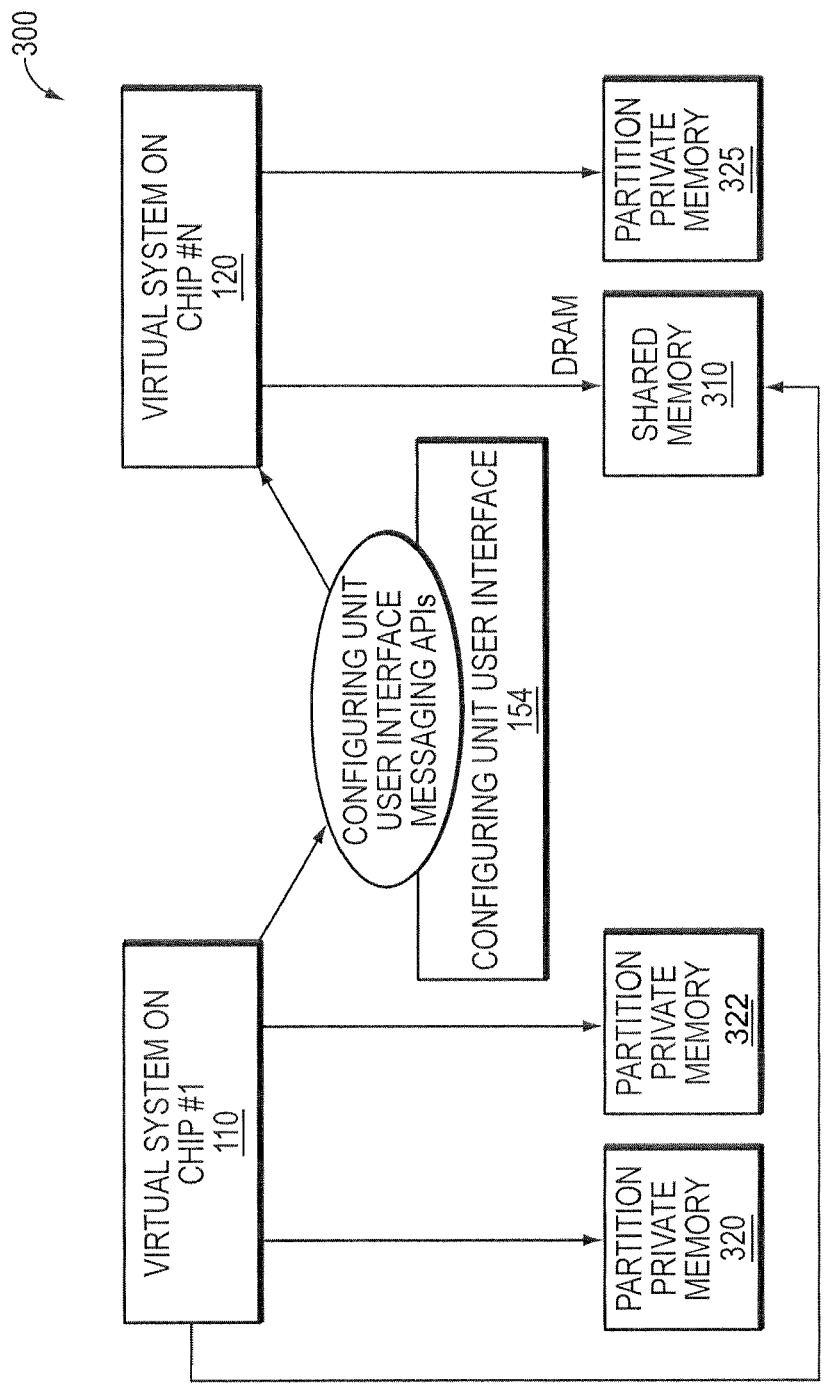
FIG. 3 is a high-level block diagram of management functions provided by a configuring unit user interface according to certain embodiments of the present invention.

FIG. 3 is a high-level block diagram of management functions provided by a configuring unit user interface 154 according to certain embodiments 300 of the present invention. The configuring unit user interface 154 provides for allocating shared memory 310 and access control among the virtual systems on chip. The configuring unit user interface 154 may further provide for low overhead messaging application programming interface for messaging within a virtual system on chip. Specifically, as shown in FIG. 3, each virtual system on chip 110, 120 may exclusively employ assigned partitions of the DRAM 320, 322, 325. A shared portion of the DRAM may also be employed by multiple virtual systems on chip. For example, in the embodiment shown in FIG. 3, virtual system on chip #1 exclusively employs two DRAM partitions 320, 322, and also shares a shared partition of the memory 310 with virtual system on chip #n. Similarly, virtual system on chip #n exclusively employs a DRAM partition 325, and also shares the shared partition of the memory 310 with virtual system on chip #1.

Figure 4:
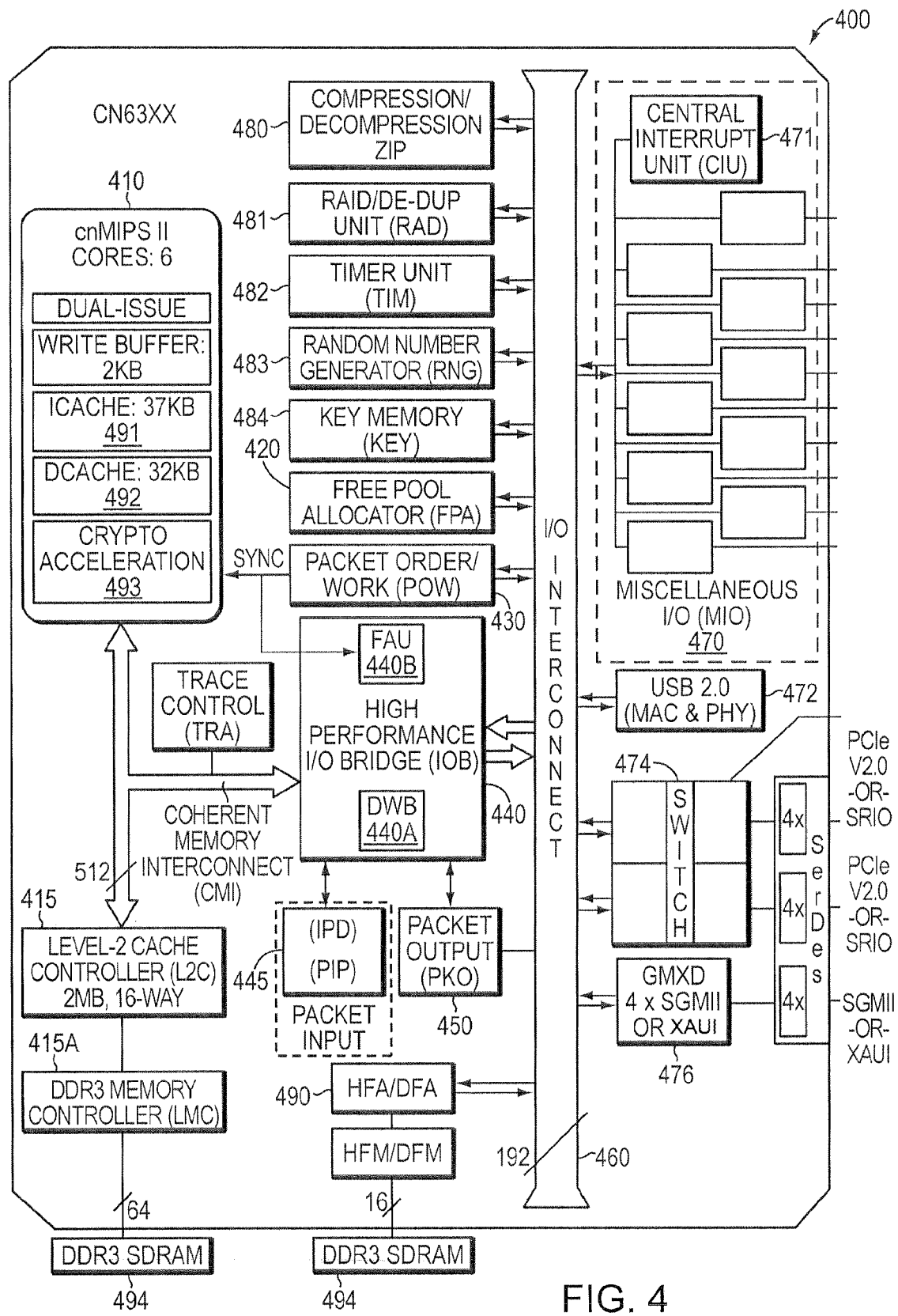
FIG. 4 is an illustration of a high-level view of a chip that may be used with example embodiments of the present invention.

FIG. 4 is an illustration of a high-level view of a processor 400 that may be used with example embodiments of the present invention. For example, the processor may be a Cavium OCTEON 63xx, available from Cavium Networks, Mountain View, Calif.

Such processors may be used in a wide variety of networking and storage equipment, including routers, switches, security appliances, content-aware switches, triple-play gateways, aggregation devices and gateways, storage arrays, storage networking equipment, and servers.

The processor may include one or more CPU cores 410. The CPU cores 410 are full-functionality and high-performance integer implementations and directly support industry standard C/C++ (and other) programming environments. These cores 410 have all the necessary requirements to boot and run full-functionality operating systems. Shared main memory may be implemented via the level two cache 415 and the DRAM.

A packet is received for processing by an ingress interface (e.g., XAUI 476). The processor 400 performs pre-processing of the received packet by checking various fields in the headers included in the received packet and then forwards the packet to the packet input unit 445. In the ingress direction packets (i.e., work requests) are classified based on VMID. In certain embodiments, upon arrival, the work requests are processed and the VMID is assigned and/or extracted. The VMID may be assigned based on fields extracted from the packet (e.g., a metadata field) of the work requests and/or from a preconfigured lookup table. Based on the assigned VMID, the work request is assigned to a corresponding virtual system on processor. For example, using the preconfigured lookup table, a certain VMID may be assigned to a packet having a certain destination MAC address.

The packet input unit 445 performs further pre-processing of the headers included in the received packet. The pre-processing may include checksum checks for Transmission Control Protocol (TCP)/User Datagram Protocol (UDP) (L3 network protocols).

The packet input 445 (PIP/IPD) may also be configured to support virtualization as a function of VMID. Based on the VMID, the PIP/IPD employs different FPA pools, groups, input queues for different type of traffic identified by the input port. The PIP/IPD may further add a VMID to every submitted work request.

A Free Pool Allocator (FPA) 420 maintains pools of pointers to free memory in level two cache memory 415 and DRAM 494. The input packet processing unit (IPD) uses one of the pools of pointers to store received packet data in level two cache memory 415 or DRAM and another pool of pointers to allocate work queue entries for the processor cores.

The free pool allocator (FPA) 420 may also be configured to support virtualization as a function of VMID. Additional free pools may be added to support the virtual systems on processor. The FPA adds a VMID onto every generated work request and employs the VMID to determine if free buffers are available for allocation.

The packet input unit 445 writes packet data into buffers in the level two cache 415 or DRAM in a format that is convenient to higher-layer software executed in at least one processor core 410 for further processing of higher level network protocols.

The processor core 410 includes instruction cache 491, Level 1 data cache 492 and crypto acceleration 493.

Level two cache memory 415 and DRAM memory is shared by all of the processor cores 410 and I/O co-processor devices. Each processor core 410 is coupled to the level two cache memory 415 by a coherent memory bus. The coherent memory bus is the communication channel for all memory and I/O transactions between the processor cores 410, the I/O Bridge (IOB) 440 and the Level 2 cache and controller 415A.

The level 2 cache memory controller 415 maintains memory reference coherence. It returns the latest copy of a block for every fill request, whether the block is stored in the L2 cache, in DRAM or is in-flight. It also stores a duplicate copy of the tags for the data cache 492 in each processor core 410. It compares the addresses of cache block store requests against the data cache tags, and invalidates (both copies) a data cache tag for a processor core 410 whenever a store instruction is from another processor core or from an I/O component via the I/O Bridge 440.

Example embodiments of the present invention implement features outside of the core which identify and provide control for the core. These features include assignment of a VMID to each core. Specifically, the VMID is appended to all the memory and IO requests initiated by core. An interrupt may be generated by the external logic if a request generated by the core has an assigned VMID that is different from the VMID of the core.

The level two cache 415 is shared by all of the CPU cores 410 instructions/data and hardware device direct memory accesses. The level two cache 415 can be partition bypassed on a reference-by-reference basis. The input/output (I/O) devices can have direct memory access into the level two cache. Example embodiments of the present invention implement features for assignment of level two cache partitions. For example, exclusive partitions of the cache may be assigned to each virtual system on processor. The number of level two cache partitions depends on the number of virtual systems on processor supported, level of quality of service, and the ability to set the quality of service on a virtual systems on processor basis. Each work request includes a VMID and DRAM access is restricted based on the VMID. In some embodiments the VMID is 6 bits. Some embodiments allow for a programmed maximum number of VMIDs. The granularity of DRAM protection may be found as a function of maximum number of VMIDs (NVID) and a programmed level two cache/dram size (SZD). For example, in some embodiments the granularity of the DRAM protection may be found using:

$$GRAN = \frac{(SZD \times NVID)}{8192}$$

The granularity may range from 1 Mega bytes to 1 Giga bytes.

Given that all memory accesses from cores, input/output blocks, hardware assist engines need to pass through the level two cache, the level two cache serves as a central location for all memory accesses inside a system on chip. Therefore, a level two cache controller can be expected to control all memory access.

Certain embodiments minimize the required number of entries needed to be maintained in the level-two cache controller per VMID access by increasing the granularity.

In certain embodiments, the size of number of bits stored in the level-two cache controller for access control may be fixed so that a table of access rules may be maintained on the chip. Each stored bit represents a particular location in the DRAM and indicates whether a particular VMID has access (i.e., read or write access) to that location. Since the bit size is fixed and number of virtual systems on chip and actual external physical DRAM size may vary from system to system, the granularity of access control (for each VMID) may be varied using the above granularity equation.

The processor 400 may also include application specific co-processors that offload the processor cores 410 so that the processor achieves high-throughput. For example, the DFA module 490 includes dedicated DFA engines to accelerate pattern and signature match necessary for anti-virus (AV), Intrusion Detection Systems (IDS) and other content processing applications at up to 4 Gbps.

The I/O Bridge (IOB) 440 manages the overall protocol and arbitration and provides coherent I/O partitioning. The IOB 440 includes a bridge 440A and a Fetch and Add Unit (FAU) 440B. Registers in the FAU 440B are used to maintain lengths of the output queues that are used for forwarding processed packets through the packet output unit 450. The I/O bridge 440 includes buffer queues for storing information to be transferred between the I/O bus, coherent memory bus, the packet input unit 445 and the packet output unit 450.

The high performance I/O bridge (IOB) 440 may also be configured to support virtualization as a function of VMID. The IOB adds a VMID to each request and restricts IO access as a function of VMID.

The Packet order/work (POW) module 430 queues and schedules work for the processor cores 410. Work is queued by adding a work queue entry to a queue. For example, a work queue entry is added by the packet input unit 445 for each packet arrival. The timer unit 482 is used to schedule work for the processor cores 410.

Processor cores 410 request work from the POW module 430. The POW module 430 selects (i.e. schedules) work for a processor core 410 and returns a pointer to the work queue entry that describes the work to the processor core 410.

The packet order and work (POW) register 430 may also be configured to schedule work requests as a function of the VMIDs. For example, the number of POW queues may be increased to handle multiple virtual systems on processor. The actual number of the queues depends on the number of virtual systems on processor that need to be supported. Additionally, each virtual system on processor may be assigned an exclusive configuration and status register (CSR) to allow for POW access for regular functionality. The POW distributes the work requests based on VMID to corresponding virtual systems on processor. In certain embodiments, the number of input queues may be increased to 128 or higher to meet the needs of virtual systems on processor.

After the packet has been processed by the processor cores 410, a packet output unit (PKO) 450 reads the packet data from memory, performs L4 network protocol post-processing (e.g., generates a TCP/UDP checksum), forwards the packet through the GMX/SPC unit 476 and frees the L2 cache/DRAM used by the packet.

The packet output 450 (PKO) may also be configured to support virtualization as a function of VMID.

The processor may further include a miscellaneous input/output unit 470 including a central interrupt unit 471, a USB 2.0 a compression/decompression unit 480, a RAID/De-Dup unit 481, a timer unit 482, a random number generator 483, and a key memory 484.

While this invention has been particularly shown and described with references to example embodiments thereof, it will be understood by those skilled in the art that various changes in form and details may be made therein without departing from the scope of the invention encompassed by the appended claims.

It should be understood that elements of the block, flow, and network diagrams described above may be implemented in software, hardware, or firmware. In addition, the elements of the block, flow, and network diagrams described above may be combined or divided in any manner in software, hardware, or firmware. If implemented in software, the software may be written in any language that can support the embodiments disclosed herein. The software may be stored on any form of non-transitory computer readable medium, such as random access memory (RAM), read only memory (ROM), compact disk read only memory (CD-ROM), and so forth. In operation, a general purpose or application specific processor loads and executes the software in a manner well understood in the art.

What is claimed is:

1. A device comprising:
a plurality of virtual systems on chip, each virtual system on chip (VSoC) relating to a subset of a plurality of processing cores on a single physical chip enabling embedded multi-core virtualization of the single physical chip and a configuring unit arranged to:
assign a unique identification tag of a plurality of identification tags to each VSoC;
assign memory subsets of a given memory to each of the plurality of virtual systems on chip;
assign each memory subset a given identification tag of the plurality of identification tags, the given identification tag assigned to a corresponding VSoC to which the memory subset is assigned; and
provide a granularity of memory protection based on a number of the plurality of identification tags assigned;
further comprising a plurality of access control elements on the single physical chip, wherein the configuring unit is further arranged to set each access control element to control whether a given VSoC of the plurality of virtual systems on chip is enabled to access a given at least one location of the given memory.

2. The device of claim 1, wherein the granularity of memory protection provided is further based on a programmed memory size of the given memory.

3. The device of claim 1, wherein:
a total element number of the plurality of access control elements is static;
the number of the plurality of identification tags assigned and a programmed memory size of the given memory are variable; and
the granularity of memory protection provided is further based on the programmed memory size of the given memory and the total number of the plurality of access control elements.

4. The device of claim 1, wherein the given memory is a Dynamic Random Access Memory (DRAM) and the DRAM is shared by each VSoC of the plurality of virtual systems on chip.

5. The device of claim 1, wherein the given memory is a level two cache and the level two cache is shared by each VSoC of the plurality of virtual systems on chip.

6. The device of claim 5, wherein the level two cache is configured to enable or restrict access to at least one other memory by the plurality of virtual systems on chip based on a first identification tag of the plurality of identification tags associated with the access and a second identification tag assigned to the at least one other memory.

7. The device of claim 1, wherein at least one exclusive partition of the given memory is assigned to each VSoC of the plurality of virtual systems on chip.

8. The device of claim 7, wherein a total number of the at least one exclusive partition assigned is based on the number of the plurality of identification tags assigned and a corresponding level of quality of service associated with each VSoC of the plurality of virtual systems on chip.

9. The device of claim 1, wherein each VSoC of the plurality of virtual systems on chip serves as a virtualized execution environment for executing operating systems and embedded applications.

10. A method comprising:
assigning a unique identification tag of a plurality of identification tags to each virtual system on chip (VSoC) of a plurality of virtual systems on chip, each VSoC relating to a subset of a plurality of processing cores on a single physical chip enabling embedded multi-core virtualization of the single physical chip;
assigning a unique identification tag of a plurality of identification tags to each VSoC;
assigning memory subsets of a given memory to each of the plurality of virtual systems on chip;

assigning each memory subset a given identification tag of the plurality of identification tags, the given identification tag assigned to a corresponding VSoC to which the memory subset is assigned;

providing a granularity of memory protection based on a number of the plurality of identification tags assigned;

storing a plurality of access control elements on the single physical chip; and setting each access control element to control whether a given VSoC of the plurality of virtual systems on chip is enabled to access a given at least one location of the given memory.

11. The method of claim 10, wherein providing the granularity of memory protection is further based on a programmed memory size of the given memory.

12. The method of claim 10, wherein:
setting a total element number of the plurality of access control elements, statically;
enabling the number of the plurality of identification tags assigned and a programmed memory size of the given memory to vary; and
providing the granularity of memory protection further based on the programmed memory size of the given memory and the total number of the plurality of access control elements set.

13. The method of claim 10, wherein the given memory is a Dynamic Random Access Memory (DRAM) shared by each VSoC of the plurality of virtual systems on chip.

14. The method of claim 10, wherein the given memory is a level two cache shared by each VSoC of the plurality of virtual systems on chip.

15. The method of claim 14, further including configuring the level two cache to enable or restrict access to at least one other memory by the plurality of virtual systems on chip based on a first identification tag of the plurality of identification tags associated with the access and a second identification tag assigned to the at least one other memory.

16. The method of claim 10, further comprising assigning at least one exclusive partition of the given memory to each VSoC of the plurality of virtual systems on chip.

17. The method of claim 16, further including assigning a total number of the at least one exclusive partition based on the number of the plurality of identification tags assigned and a corresponding level of quality of service associated with each VSoC of the plurality of virtual systems on chip.

18. The method of claim 10, further including configuring each VSoC of the plurality of virtual systems on chip to serve as a virtualized execution environment for executing operating systems and embedded applications.

* * * * *